United States Patent
Ehgartner et al.

[15] 3,697,018
[45] Oct. 10, 1972

[54] REEL AND RETAINING MEANS FOR MOTION PICTURE FILM OR THE LIKE

[72] Inventors: Gabriele Ehgartner, Pullach; Herbert Wilsch, Unterhaching, both of Germany

[73] Assignee: Agfa-Gevaert Aktiengesellschaft, Leverkusen, Germany

[22] Filed: July 28, 1971

[21] Appl. No.: 166,702

[30] Foreign Application Priority Data

July 31, 1970 Germany..........P 20 38 082.9

[52] U.S. Cl...............................................242/197
[51] Int. Cl......G03b 1/04, G11b 15/32, G11b 23/04
[58] Field of Search................242/197–200, 74, 242/74.1, 195

[56] References Cited

UNITED STATES PATENTS

| | | | |
|---|---|---|---|
| 3,208,687 | 9/1965 | Campbell, Jr. et al.......242/74 |
| 3,288,392 | 11/1966 | Goldberg......................242/74 |
| 3,326,483 | 6/1967 | Ivans...........................242/74 |
| 3,606,199 | 9/1971 | Fujimoto....................242/187 |

*Primary Examiner*—Leonard D. Christian
*Attorney*—Michael S. Striker

[57] ABSTRACT

A supply real for motion picture film has a socket which can receive the free end of the innermost convolution of film, and an integral retaining device which can be readily broken off and has a clamping portion insertable into the socket to clamp the free end of the innermost convolution against the reel. The retaining device is further provided with an additional portion which extends beyond the socket when the latter received the clamping portion to serve as a means for preventing improper insertion of the reel into certain types of cassettes. The additional portion can be broken away from the clamping portion so that the reel, with the clamping portion inserted into the socket and with the additional portion broken away, can be inserted into cassettes of another type which do not permit insertion of reels with the additional portions of retaining devices extending beyond the sockets.

10 Claims, 4 Drawing Figures

PATENTED OCT 10 1972 3,697,018
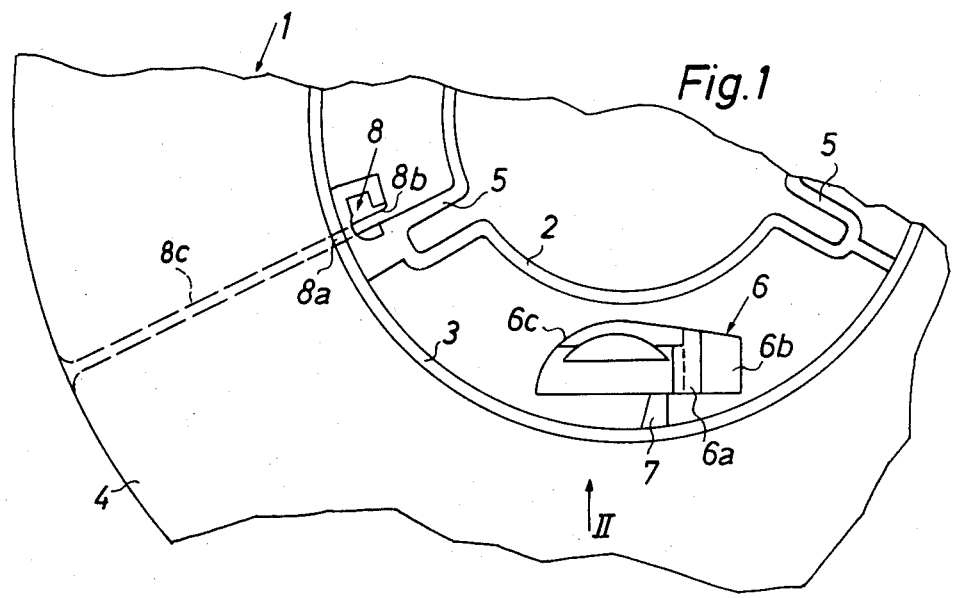
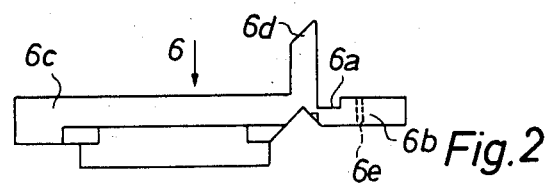
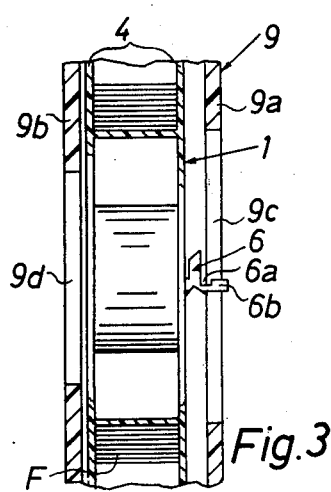
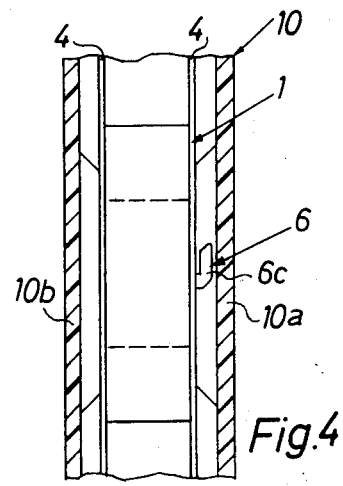
INVENTOR
GABRIELE EHGARTNER
HERBERT WILSCH
BY
Attorney

3,697,018

REEL AND RETAINING MEANS FOR MOTION PICTURE FILM OR THE LIKE

BACKGROUND OF THE INVENTION

The present invention relates to reels for convoluted strip-shaped flexible material, especially to supply reels for convoluted motion picture film. More particularly, the invention relates to improvements in reels which are provided with sockets, preferably in the region of their cores, which can receive the free end portions of innermost convolutions of convoluted strip-shaped material and portions of clamping or retaining devices serving to press such end portions against the reels to thus prevent complete separation of strip-shaped material.

It is already known to provide a supply reel for motion picture film with a socket and with a retaining or clamping device which can be inserted into the socket for the purpose of clampingly engaging and retaining an end portion of motion picture film. Such retaining devices are configurated in such a way that a portion thereof extends beyond the socket to serve as a means for insuring proper insertion of the reel into a cassette, magazine or an analogous container for supply reels. A drawback of such retaining devices is that they cannot be used with reels which must be inserted into containers that provide no room for the outwardly extending portions of clamping devices. Therefore, a different retaining or clamping device must be produced for use in each of a plurality of different types of cassettes or like containers which are presently available for storage of supply reels for motion picture film or the like.

SUMMARY OF THE INVENTION

An object of the invention is to provide a reel for motion picture film or like strip-shaped flexible material and a novel and improved clamping or retaining device which is more versatile than presently known retaining devices and can be used on reels which are insertable into two or more different cassettes or analogous containers.

Another object of the invention is to provide a convertible retaining device which can be used with reels for motion picture film or the like for insertion into containers which can only accommodate the reel but provide no room for any parts which extend beyond the outlines of the reel as well as for insertion into containers which are designed to receive reels with retaining devices that extend beyond the outlines of the reels.

A further object of the invention is to provide an improved versatile retaining device of the just outlined character which is produced in such a way that it is less likely to be lost or misplaced prior to utilization for retention of the end portion of innermost convolution of motion picture film or other strip-shaped flexible material in a reel and which can be readily and conveniently withdrawn to permit separation of such material if and when necessary.

An additional object of the invention is to provide a combination of a reel for motion picture film or the like with a retaining or clamping device for such strip-shaped material which can be utilized in two or more different types of cassettes or analogous containers.

A feature of the invention resides in the provision of a combination which comprises a reel which is intended for temporary or permanent storage of motion picture film or other convoluted flexible strip-shaped material and has a pocket or socket (preferably in the region of its core) for reception of a portion of strip-shaped material (preferably the free end portion of the innermost convolution), and a novel retaining or clamping device having a relatively weak first connecting portion which is readily separably secured to (and preferably integral with) the reel, a clamping portion which is insertable into the socket upon separation of the first connecting portion from the reel to thereby clampingly engage that portion of strip-shaped material which is received in the socket and to press such portion against the adjacent surface of the reel, an additional portion which extends from the socket when the latter receives the clamping portion, and a second relatively weak connecting portion between the clamping portion and the additional portion. The additional portion is readily separable from the clamping portion in the region of the relatively weak second connecting portion to thus reduce the combined dimensions of the reel and retaining device (namely, the clamping portion of such retaining device).

Prior to separation of the additional portion, the retaining device can be used with a reel which is to be inserted into a cassette or container of a first type, namely, into a container which can receive the reel even though the additional portion of the retaining device extends beyond the socket. If the reel is to be received in a container which does not provide room for the additional portion of the retaining device, the additional portion is separated from the clamping portion along or in the region of the second connecting portion to thus reduce the combined dimensions of the reel and the fragmentized retaining device.

The novel features which are considered as characteristic for the invention are set forth in particular in the appended claims. The improved clamping or retaining device itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary side elevational view of a reel for motion picture film which is provided with an integral clamping or retaining device embodying one form of the invention;

FIG. 2 is an enlarged end elevational view of the clamping device as seen in the direction of arrow II in FIG. 1;

FIG. 3 is a fragmentary sectional view of a first cassette which can receive the reel of FIG. 1 and the entire clamping device of FIG. 2; and FIG. 4 is a similar fragmentary sectional view of a second cassette which can receive the reel of FIG. 1 and only a portion of the clamping device shown in FIG. 2.

DESCRIPTION OF THE PREFERRED EMBODIMENTS

Referring first to FIG. 1, there is shown a portion of a supply reel 1 for convoluted motion picture film. Such reels are preferred for use in cartridges, cassettes, magazines or analogous containers for motion picture film which can be slipped into a motion picture camera or mounted on a motion picture projector with less loss in time. The illustrated reel 1 has a nave or hub 2, a core 3 which is integrally connected with the hub 2 by radially extending ribs or spokes 5, and two flanges 4 (only one shown) which extend radially beyond the axial ends of the core 3. The inner end portion of motion picture film which is to be convoluted around the core 3 can be inserted sideways though a radial slit 8c of one of the flanges 4 and can be retained by a clamping or retaining device 6 which is shown on a larger scale in FIG. 2.

The clamping or retaining device 6 is preferably made as an integral but readily detachable component part of the reel 1. In the illustrated embodiment, the retaining device 6 is integrally connected with the core 3 by a relatively narrow and weak connecting portion of web 7 which can be readily broken to permit insertion of the thus separated retaining device into a pocket or socket 8 provided in or on one of the ribs 5 and serving to also receive the free end portion of the innermost convolution of film on the core 3. As shown, the connecting portion or web 7 extends toward the hub 2 and the entire retaining device 6 (prior to detachment from the core 3) is received in the space between the core and the hub. At the present time, we prefer to manufacture the reel 1 and the retaining device 6 by injection molding from a suitable synthetic plastic material.

Once the retaining device 6 is separated from the reel 1 by destroying or breaking the fragile web 7, it can be readily inserted into and retained in the socket 8 in the following way: The socket 8 communicates with two slots 8a, 8b which extend in the axial direction of the reel 1. The free end portion or tip of motion picture film which is to be convoluted onto the core 3 is introduced through the slots 8a, 8b so that a portion of such end portion extends through the socket 8. The film is introduced in a direction from the space between the flanges 4, through the slot 8a, through the socket 8, through the slot 8b, and into the space between the core 3 and the hub 2. The retaining device 6 is thereupon inserted into the socket 8 in a direction which is parallel with the axis of the reel 1 whereby the clamping portion 6c of the retaining device frictionally engages the film and presses it against the adjacent surface or surfaces surrounding the socket. The insertion of the end portion of film into the space between the flanges 4 and into the outer slot 8a is facilitated by the provision of the aforementioned radial slit 8c in one of the flanges 4. The configuration of the clamping portion 6c is such that it preferably fills the socket 8 (or at least that portion of the socket through which the film extends) to thus insure that the end portion of the film is secured to the core 3 (and more particularly to one of the ribs 5) with a force which suffices to guarantee that the film is not extracted when it is completely paid out by the reel and is tensioned to extend substantially radially of the core 3 (e.g., in the longitudinal direction of the slit 8c).

In accordance with a feature of the invention, the retaining device 6 is designed in such a way that it can be used with the reel 1 in several types of containers or cassettes two of which are shown in FIGS. 3 and 4. The cassette 9 of FIG. 3 is configured and dimensioned so that it can properly accommodate the reel 1 of FIG. 1 and the entire retaining device 6 after the latter's clamping portion 6c is properly inserted into the socket 8. The cassette 9 has two parallel side walls 9a, 9b which are outwardly adjacent to, spaced from and parallel with the respective flanges 4 of the inserted reel 1. The walls 9a and 9b are respectively provided with coaxial openings or holes 9c, 9d. The diameter of the opening 9d is smaller than the diameter of the opening 9c. When the reel 1 is properly centered in the cassette 9, the core 3 is coaxial with the openings 9c and 9d. It will be seen that the radius of the opening 9d is smaller than the distance from the socket 8 to the axis of the reel 1 so that the socket 8 is concealed by the side wall 9b and the retaining device 6 cannot remain in the socket 8 if the user attempts to insert the reel 1 into the cassette 9 the wrong way, namely, in such a way that the portion 6b of the retaining device 6 would be adjacent to the side wall 9b. However, the radius of the opening 9c is at least as large as the distance between the socket 8 and the axis of the reel 1 so that the entire retaining device 6 can be readily introduced into or removed from the socket 8 after the reel 1 is inserted into the cassette 9. The dimensions of the full-sized or entire retaining device 6 (as it appears when the web 7 is destroyed) are such that the additional portion 6b of this device extends into and even beyond the opening 9c of the side wall 9a. This renders the retaining device 6 readily accessible and reduces the likelihood and/or possibility of inserting the reel 1 (with the retaining device 6 already inserted into the socket 8) into the cassette 9 in improper position or orientation. The socket 8 can be designed in such a way that it is open at one end only, namely, at that end which is adjacent to the opening 9c of the side wall 9a. This practically eliminates the possibility of improper insertion of the reel 1 into the cassette 9 because, when the operator wishes to insert the reel 1 and the retaining device 6, he or she immediately notes that the reel 1 is inserted in the wrong way if the open end of the socket 8 is not accessible at the opening 9c. If the side walls 9a, 9b form part of two shells which can be assembled to form the cassette 9, the shells can be properly coupled to each other in a plane which is located between the side walls 9a, 9b only if the reel 1 is positioned between the two shells in such a way that the outwardly extending additional portion 6b of the retaining device 6 faces the opening 9c in the side wall 9a. Thus, the cassette 9 can be assembled around the reel 1 only when the retaining device 6 extends beyond that flange 4 which is adjacent to the side wall 9a. The reference character F denotes a supply of motion picture film or like strip-shaped material which is convoluted around the core 3. The free end portion of the innermost convolution of the material F is clamped to the reel 1 by the portion 6c of the retaining device 6.

FIG. 4 illustrates a portion of a cassette 10 which also comprises two parallel side walls 10a, 10b. However, the side walls 10a, 10b do not have openings corresponding to those shown in FIG. 3, as at 9c and 9d. Also, the width of the space between the inner sides of the side walls 10a, 10b (when the cassette 10 is properly assembled) is less than the axial length of the reel 4 plus the length of that additional portion 6b of a full-sized retaining device 6 which extends beyond the open end of the socket 8. Therefore, the combination of the reel 1 and retaining device 6 shown in FIG. 3 could not be accommodated in the cassette 10 of FIG. 4.

In order to insure that the reel 1 can be properly inserted into the cassette 10 and also that one end portion of the film which is convoluted on the core 3 of such reel is properly held against extraction, the clamping device 6 of FIG. 2 comprises a relatively weak second connecting portion 6a which allows for separation of the additional portion 6b to thus reduce the overall length of the remaining part (clamping portion 6c) of the retaining device 6 to a size which allows for insertion of the reel 1 into the cassette 10 and for proper retention of the end portion of film in the socket 8. The clamping portion 6c of the retaining device 6 constitutes that part which can be snugly received in the socket 8 to clamp the end portion of motion picture film against the respective rib 5. Thus, when the retaining device 6 of FIG. 2 is to be used with a reel 1 which is to be inserted into a cassette 10, the operator simply breaks off the additional portion 6b along the weakened connecting portion 6a to thus reduce the overall length of the retaining device. The clamping portion 6c is inserted into the socket 8 prior or subsequent to separation of the additional portion 6b. The weakened connecting portion 6a can be formed by providing the retaining device 6 with one or more notches, perforations or the like to thus insure that a relatively small force which is applied to the additional portion 6b will suffice to separate the portion 6b from the clamping portion 6c. It will be noted that the outermost part of the clamping portion 6c extends beyond the right-hand flange 4 of the reel 1 shown in FIG. 4. This is desirable in order to enable the operator to withdraw the clamping portion 6c from the socket 8, if and when necessary.

It is clear that the reel 1 and the retaining device 6 (or an analogous retaining device) can be used in three or more different types of cassettes or containers for motion picture film or analogous strip-shaped material. For example, if the clamping portion 6c shown in FIG. 4 is too long for insertion into a further cassette (not shown) whose side walls are even nearer to each other than the side walls 10a, 10b of the cassette 10 of FIG. 4, the clamping portion 6c can be further subdivided by separating therefrom the part which is denoted in FIG. 2 by the reference character 6d. In this way, the retaining device can be used in reels or spools which may be inserted into three different types of cassettes. Also, the configuration of the retaining device can deviate from that of the retaining device 2 shown in FIG. 2, as long as the retaining device comprises two or more relatively weak connecting portions to permit separation of one or more portions from that (clamping) portion which is to be received in a socket or the like to press the end portion of motion picture film to the core or rib or hub of a reel and as long as the retaining device can be readily separated from the reel prior to insertion of its clamping portion into the socket.

An important advantage of the improved retaining device 6 is that the additional portion 6b can serve as a convenient means for indicating whether or not the reel 1 is properly inserted into a cassette 9, and that the additional portion 6b can be readily separated from the clamping portion 6c by breaking the second connecting portion 6a if the reel 1 is to be inserted into a cassette 10. If the reel 1 is to be inserted into a cassette of a third type which can readily accommodate the clamping portion 6c and a relatively small or a relatively large section of the additional portion 6b, the latter can be provided with an additional relatively weak connecting portion 6e (indicated in FIG. 2 by broken lines) along which the outer section of the additional portion 6b can be broken away while the remaining section of the portion 6b remains integrally secured to the clamping portion 6c by way of the second connecting portion 6a.

Referring again to FIG. 1, it will be noted that the first connecting portion or web 7 extends from the internal surface of the core 3 toward the external surface of the hub 2. This is of advantage because, if the web 7 consists of relatively rigid material which is likely to form one or more rough edges upon breakage to separate the retaining device 6 from the reel 1, the edge or edges are not likely to damage the hand or fingers of the operator and/or to scratch the film. Thus, the first connecting portion 7 is preferably located in the space between the external surfaces of the two flanges 4 so that the likelihood of reaching the spot where the retaining device 6 was separated from the reel 1 is very remote. Moreover, the broken-off part of the connecting portion or web 7 which continues to adhere to the reel 1 is prevented from contacting the adjacent surface of the cassette 9 or 10 when the reel 1 is inserted into such cassette. The rubbing contact between the broken-off fragment of the web 7 and a cassette could cause noise and such fragment could even prevent insertion of the reel into a relatively narrow cassette, such as the cassette 10 of FIG. 4 if the fragment would extend laterally beyond the one or the other flange 4.

Without further analysis, the foregoing will so fully reveal the gist of the present invention that others can by applying current knowledge readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

We claim:

1. A combination of the character indicated, comprising a reel for elongated strip-shaped flexible material, particularly motion picture film, said reel having a socket for reception of a portion of strip-shaped material therein; and a retaining device having a relatively weak first connecting portion readily separably secured to said reel, a clamping portion which is insertable into said socket upon separation of said first connecting portion from said reel to thereby clamp said portion of a strip-shaped material in said socket against said reel, an additional portion extending from said socket upon insertion of said clamping portion into said socket, and a second relatively weak connecting portion between said clamping portion and said additional portion, said additional portion being readily separable from said clamping portion in the region of said second connecting portion.

2. A combination as defined in claim 1, wherein said first connecting portion is integral with said reel.

3. A combination as defined in claim 2, wherein said reel further comprises a core and said first connecting portion is integral with said core.

4. A combination as defined in claim 1, wherein said additional portion comprises at least one third relatively weak connecting portion along which said additional portion is readily separable into at least two sections one of which adheres to said second connecting portion.

5. A combination as defined in claim 1, wherein said first connecting portion is integral with said reel and consists of relatively rigid material which tends to form at least one sharp edge in response to separation of said retaining device from said reel, said reel having two end faces and said first connecting portion being located between said end faces so as not to extend axially beyond the outlines of said reel.

6. A combination as defined in claim 1, further comprising a container accommodating said reel and provided with an opening through which said additional portion of said retaining device extends upon insertion of said clamping portion into said socket.

7. A combination as defined in claim 6, wherein said container has two side walls and wherein said opening is provided in only one of said side walls so that said reel and said retaining device can be received in said container only in such positions that said additional portion extends beyond said socket and into the opening of said one side wall.

8. A combination as defined in claim 1, further comprising a container accommodating said reel and said clamping portion of said retaining device when said clamping portion is received in said socket, said container comprising a wall adjacent to and spaced from said socket by a distance which is too short to permit insertion of said reel into said container with said clamping portion extending into said socket and with said additional portion extending beyond said socket but large enough to permit insertion of said reel into said container with said clamping portion extending into said socket and with said additional portion separated from said clamping portion along said second connecting portion.

9. A combination as defined in claim 1, further comprising a cassette having two parallel walls and removably accommodating said reel between said walls, one of said walls having an opening in registry with said socket so that said additional portion can extend into said opening when said clamping portion is received in said socket.

10. A combination as defined in claim 1, further comprising a cassette having two parallel walls and removably accommodating said reel between said walls, said walls being separated from each other by a distance which is less than the axial length of said reel and the extent to which said additional portion projects beyond said socket when said clamping portion is received in said socket so that said additional portion must be separated from said clamping portion along said second connecting portion prior to introduction of said reel, with said clamping portion in said socket, into said cassette.

* * * * *